(No Model.) 2 Sheets—Sheet 1.

W. COPPIN.
PROPULSION OF SHIPS.

No. 258,023. Patented May 16, 1882.

WITNESSES:
Donn Twitchell
C. Sedgwick

INVENTOR:
W. Coppin
BY Munn & Co
ATTORNEYS.

(No Model.) 2 Sheets—Sheet 2.

W. COPPIN.
PROPULSION OF SHIPS.

No. 258,023. Patented May 16, 1882.

WITNESSES:
Donn Twitchell
C. Sedgwick

INVENTOR:
W. Coppin
BY Munn & Co
ATTORNEYS.

UNITED STATES PATENT OFFICE.

WILLIAM COPPIN, OF LONDON, ENGLAND.

PROPULSION OF SHIPS.

SPECIFICATION forming part of Letters Patent No. 258,023, dated May 16, 1882.

Application filed February 23, 1882. (No model.) Patented in England July 7, 1881, No. 2,996.

*To all whom it may concern:*

Be it known that I, WILLIAM COPPIN, of London, England, have invented certain new and useful Improvements in the Propulsion of Vessels, of which the following is a full, clear, and exact description.

My invention relates to the propulsion of ocean and river vessels and canal-boats, and has the object to use paddle-wheels more effectively and without exposing them to injury. For this purpose I fit the wheels in air-tight paddle-boxes within the vessel, and by air-pressure force the water-level down to the line for the most advantageous action, as hereinafter described and claimed.

Reference is to be had to the accompanying drawings, forming part of this specification, in which similar letters of reference indicate corresponding parts in all the figures.

Figure 1:
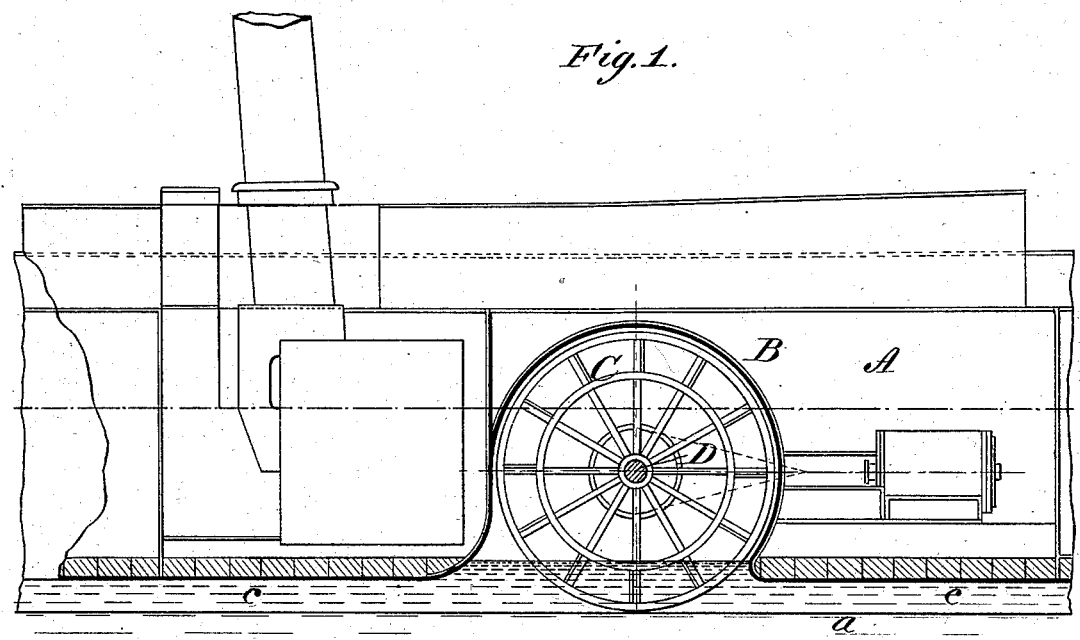
Figure 2:
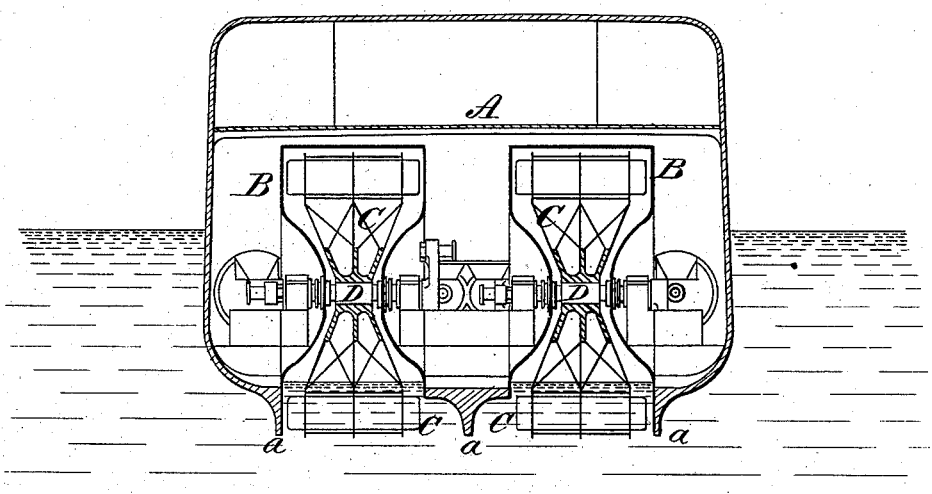
Figure 3:
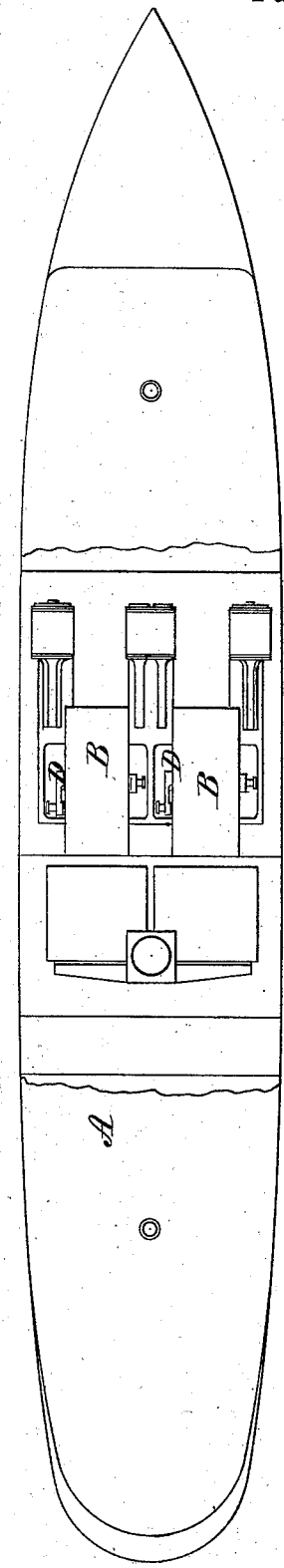

Figure 1 is a longitudinal section of a vessel constructed with interior paddle-wheels in accordance with my invention. Fig. 2 is a transverse section of the vessel, and Fig. 3 is a sectional plan view.

The vessel A, whether intended for ocean, river, or canal navigation, is of usual build. At the mid-length of the vessel are paddle-boxes B B, opening through the bottom of the vessel and containing the paddle-wheels C C. The paddle-boxes are preferably constructed of iron plates, riveted tightly to form air-tight boxes, fitting as snugly as may be to the wheels. The wheels are on shafts D D, that pass through air-tight boxes in the sides of the paddle-boxes. Air is to be forced into the boxes B by suitable air-compressing pumps, and an air-pressure maintained sufficient to force the water down to about the level shown by dotted lines, so that the water in the boxes is sufficient to immerse the lower paddles of the wheels. This will insure a solid body of water of a density proportioned to the column displaced or draft of the vessel. Below, and at each side of the paddle-boxes, there are depending flanges or keels $a$ $a$ $a$, which extend the whole length of the vessel and form channels $c$, for the current of water. The channels thus formed are in depth about equal to the width of the paddles on the wheels, so that the paddles act to force the water directly back.

It will be seen that the paddle-wheels must act in the most effective manner for the propulsion of the vessel, as they are not submerged below the effective working-line, and they also act on a solid body of water. The wheels are also protected from the action of wind and waves, and, being at the middle of the vessel, are not raised out of water by pitching of the vessel. For canal navigation this method of propulsion is advantageous, because no great disturbance of the water is caused, a smooth current being only sent to the rear.

For small vessels a single paddle-wheel may be used in place of two, and for smooth-water navigation the box or boxes may be placed as far toward the stern as desired. Screw-propellers may also be used in the air-tight boxes in place of paddle-wheels.

Having thus fully described my invention, I claim as new and desire to secure by Letters Patent—

The combination, with a vessel having channels $c$ between keels $a$ for the whole length of the vessel, of the median air-tight paddle-boxes B, opening into the channels $c$, and the paddle-wheels C, having their shafts journaled in air-tight bearings, whereby compressed air may be employed to force the water in said boxes to a level just above the paddles, and thus permit said paddles to utilize a maximum of the power, while the water will be so condensed as to produce a maximum of resistance, as described.

WILLIAM COPPIN.

Witnesses:
GEO. D. WALKER,
C. SEDGWICK.